United States Patent Office 2,726,274
Patented Dec. 6, 1955

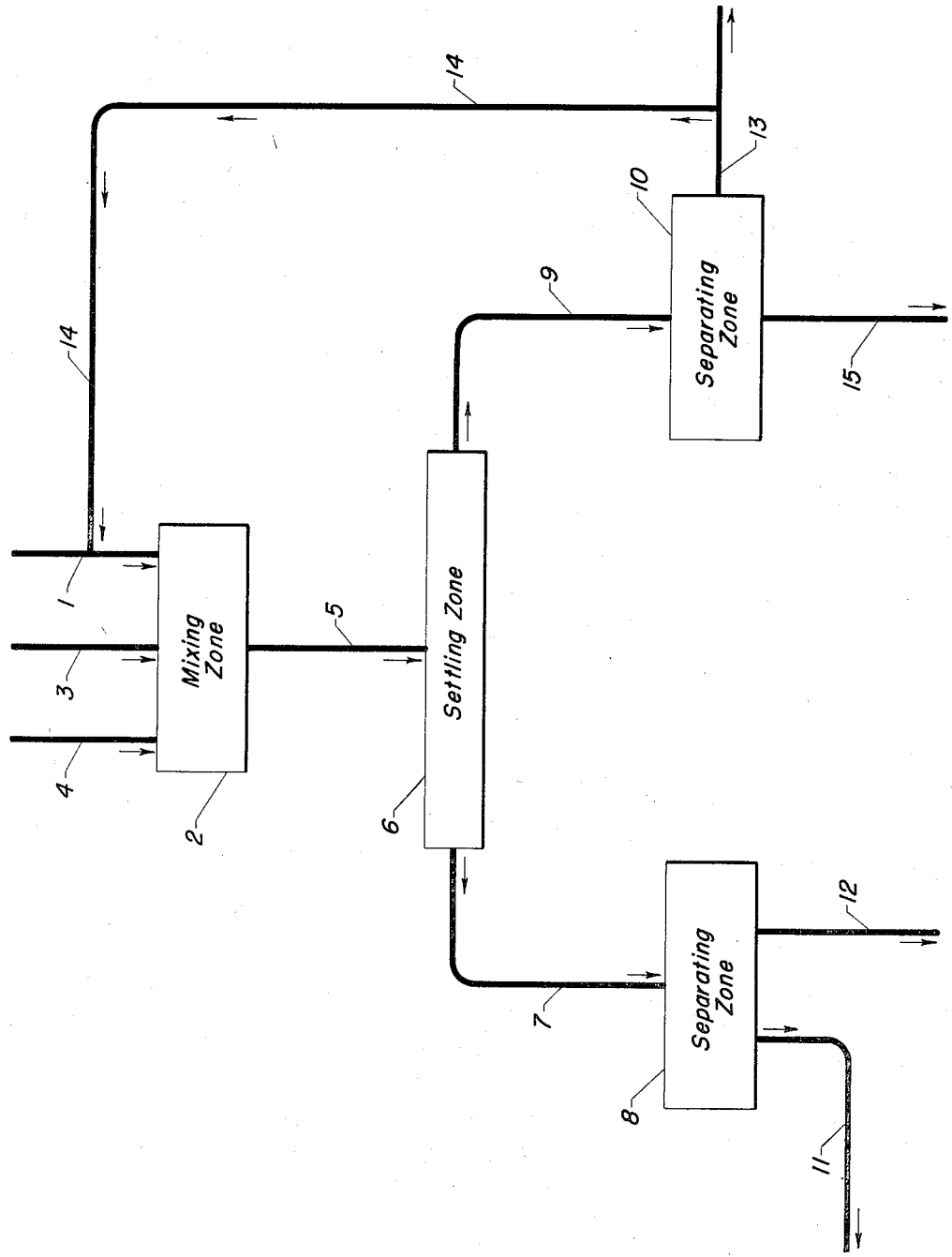

2,726,274

PRODUCTION OF DRYING OILS

Herman S. Bloch, Chicago, and Richard C. Wackher, La Grange, Ill., assignors to Universal Oil Products Company, Des Plaines, Ill., a corporation of Delaware Application November 17, 1952, Serial No. 320,962

20 Claims. (Cl. 260—666)

This application is a continuation-in-part of our copending application Serial No. 30,158, filed May 29, 1948, now Patent No. 2,622,109, December 16, 1952.

This invention relates to a process for producing a drying oil by reacting an olefinic hydrocarbon having at least three carbon atoms per molecule with an unsaturated organic compound selected from the members of the group consisting of a olefinic alcohol, thiol, aldehyde, ketone, ester and ether. More particularly, the invention is concerned with the production of a substantially saturated liquid hydrocarbon product and a polyunsaturated drying oil by polymerization and hydrogen transfer reactions of and olefinic hydrocarbon having at least three carbon atoms per molecule with a substituted ethylene compound of the general formula

R—CH=CH—R' wherein R' is a member of the group consisting of a hydrogen atom and an alkyl radical, and R is a member of the group consisting of hydroxyalkyl, acyloxy, alkoxy, acyloxylalkyl, acyl, mercaptoalkyl, formyl, and formylalkyl groups.

One of the objects of this invention is the manufacture of an unsaturated organic material having more than one double bond per molecule and useful in the production of drying oils, resins, and the like.

Another object of this invention is the production of a substantially saturated hydrocarbon product and a polyunsaturated liquid organic material useful as a drying oil.

One specific embodiment of this invention relates to a process for producing a drying oil which comprises reacting an aliphatic olefinic hydrocarbon having at least 3 carbon atoms per molecule with an olefinic organic compound selected from the group consisting of an olefinic alcohol, and olefinic thiol, an olefinic aldehyde, and olefinic ketone, an olefinic ester, and an olefinic ether in the presence of an acid-acting metal halide catalyst until a reaction mixture comprising saturated hydrocarbons and polyunsaturated organic compounds is formed, separating the reaction mixture into a catalyst phase and a hydrocarbon phase, separating a relatively saturated hydrocarbon product from the hydrocarbon phase, and recovering from the catalyst phase a drying oil having more carbon atoms per molecule than the olefinic hydrocarbon charged.

Another specific embodiment of this invention relates to a process for producing a drying oil which comprises reacting an aliphatic olefinic hydrocarbon having at least 3 carbon atoms per molecule with an olefinic organic compound selected from the group consisting of an olefinic alcohol, an olefinic thiol, and olefinic aldehyde, an olefinic ketone, an olefinic ester, and an olefinic ether in the presence of aluminum chloride until a reaction mixture comprising saturated hydrocarbons and polyunsaturated organic compounds is formed, separating the reaction mixture into a catalyst phase and a hydrocarbon phase, separating a relatively saturated hydrocarbon product from the hydrocarbon phase, and recovering from the catalyst phase a drying oil having more carbon atoms per molecule than the olefinic hydrocarbon charged.

Still another specific embodiment of this invention relates to a process for producing a drying oil which comprises reacting an aliphatic olefinic hydrocarbon having at least 3 carbon atoms per molecule with an olefinic organic compound selected from the group consisting of an olefinic alcohol, an olefinic thiol, an olefinic aldehyde, an olefinic ketone, an olefinic ester, and an olefinic ether in the presence of aluminum bromide until a reaction mixture comprising saturated hydrocarbons and polyunsaturated organic compounds is formed, separating the reaction mixture into a catalyst phase and a hydrocarbon phase, separating a relatively saturated hydrocarbon product from the hydrocarbon phase, and recovering from the catalyst phase a drying oil having more carbon atoms per molecule than the olefinic hydrocarbon charged.

Still another specific embodiment of this invention relates to a process for producing a drying oil which comprises reacting an aliphatic olefinic hydrocarbon having at least 3 carbon atoms per molecule with an olefinic organic compound selected from the group consisting of an olefinic alcohol, an olefinic thiol, an olefinic aldehyde, an olefinic ketone, an olefinic ester, and an olefinic ether in the presence of boron trifluoride until a reaction mixture comprising saturated hydrocarbons and polyunsaturated organic compounds is formed, separating the reaction mixture into a catalyst phase and a hydrocarbon phase, separating a relatively saturated hydrocarbon product from the hydrocarbon phase, and recovering from the catalyst phase a drying oil having more carbon atoms per molecule than the olefinic hydrocarbon charged.

Another embodiment of this invention relates to a process for producing a drying oil which comprises reacting an olefinic hydrocarbon having at least 3 carbon atoms per molecule with a substituted ethylene compound of the general formula

R—CH=CH—R' where R' is a member of the group consisting of a hydrogen atom and an alkyl radical, and R is a member of the group consisting of hydroxyalkyl, acyloxy, alkoxy, acyloxyalkyl, acyl, mercaptoalkyl, formyl, and formylalkyl groups in the presence of a catalyst comprising essentially an acid-acting metal halide until a reaction mixture comprising saturated hydrocarbons and a complex of the catalyst with polyunsaturated organic compounds is formed, separating the reaction mixture into a catalyst phase and a hydrocarbon phase, separating a relatively saturated hydrocarbon product from the hydrocarbon phase, and recovering from the catalyst phase a drying oil having an average molecular weight and a degree of molar unsaturation greater than those of the olefinic charge stock.

Still another embodiment of this invention relates to a process for producing a drying oil which comprises reacting an olefinic hydrocarbon having at least 3 carbon atoms per molecule with a substituted ethylene compound of the general formula

R—CH=CH—R' wherein R' is a member of the group consisting of a hydrogen atom and an alkyl radical, and R is a member of the group consisting of hydroxyalkyl, acyloxy, alkoxy, acyloxalkyl, acyl, mercaptoalkyl, formyl, and formylalkyl groups in the presence of a catalyst comprising essentially aluminum chloride until a reaction mixture comprising saturated hydrocarbons and a complex of the catalyst with polyunsaturated organic compounds is formed, separating the reaction mixture into a catalyst phase and a hydrocarbon phase, separating a relatively saturated hydrocarbon product from the hydrocarbon phase, and recovering from the catalyst phase a drying oil having an average molecular weight and a degree of molar unsaturation greater than those of the olefinic charge stock.

Still another embodiment of this invention relates to a process for producing a drying oil which comprises reacting an olefinic hydrocarbon having at least 3 carbon atoms per molecule with a substituted ethylene compound of the general formula $$R\text{—}CH=CH\text{—}R'$$

where R' is a member of the group consisting of a hydrogen atom and an alkyl radical, and R is a member of the group consisting of hydroxyalkyl, acyloxy, alkoxy, acyloxyalkyl, acyl, mercaptoalkyl, formyl, and formylalkyl groups in the presence of a catalyst comprising essentially aluminum bromide until a reaction mixture comprising saturated hydrocarbons and a complex of the catalyst with polyunsaturated organic compounds is formed, separating the reaction mixture into a catalyst phase and a hydrocarbon phase, separating a relatively saturated hydrocarbon product from the hydrocarbon phase, and recovering from the catalyst phase a drying oil having an average molecular weight and a degree of molar unsaturation greater than those of the olefinic charge stock.

Still another embodiment of this invention relates to a process for producing a drying oil which comprises reacting an olefinic hydrocarbon having at least 3 carbon atoms per molecule with a substituted ethylene compound of the general formula $$R\text{—}CH=CH\text{—}R'$$

where R' is a member of the group consisting of a hydrogen atom and an alkyl radical, and R is a member of the group consisting of hydroxyalkyl, acyloxy, alkoxy, acyloxyalkyl, acyl, mercaptoalkyl, formyl, and formylalkyl in the presence of a catalyst comprising essentially boron trifluoride until a reaction mixture comprising saturated hydrocarbons and a complex of the catalyst with poly-unsaturated organic compounds is formed, separating the reaction mixture into a catalyst phase and a hydrocarbon phase, separating a relatively saturated hydrocarbon product from the hydrocarbon phase, and recovering from the catalyst phase a drying oil having an average molecular weight and a degree of molar unsaturation greater than those of the olefinic charge stock.

Monoolefinic hydrocarbons utilizable in the process have at least three carbon atoms per molecule and comprise propylene, the butylenes, pentenes, hexenes, heptenes, octenes, and higher boiling monoolefinic hydrocarbons. A preferred source of such monoolefinic hydrocarbons is polymer gasoline which is formed, for example, by polymerizing propylene and butylenes or mixtures thereof in the presence of solid phosphoric acid catalyst which is a calcined composite of a phosphoric acid and a siliceous carrier such as diatomaceous earth, also called kieselguhr. Fractions of cracked gasoline containing substantial amounts of olefins and relatively small proportions of aromatic hydrocarbons are also suitable charging stocks. These gasoline charging stocks may also contain certain amounts of paraffinic and naphthenic hydrocarbons some of which may be alkylated during the polymerization treatment. C3 and C4 fractions recovered from the products of cracking and a C4 fraction recovered from butane dehydrogenation and containing mainly butylenes and normal butane with relatively little isobutane are also good charging stocks for this process.

This specific invention relates to the conjunct copolymerization of olefinic hydrocarbons with an unsaturated organic compound selected from the members of the group consisting of an olefinic alcohol, olefinic thiol, olefinic aldehyde, olefinic ketone, olefinic ester and olefinic ether. Many of such substituted ethylene compounds have the general formula $$R\text{—}CH=CH\text{—}R'$$

wherein R' is a member of the group consisting of a hydrogen atom and an alkyl radical, and R is a member of the group consisting of a hydroxyalkyl, acyloxy, alkoxy, acyloxyalkyl, acyl (including formyl), formylalkyl, and mercaptoalkyl groups. These substituted ethylenic materials include allyl alcohol, vinyl acetate, diallyl phthalate, vinyl butyl ether, methyl vinyl ketone, allyl mercaptan, alpha-terpineol, furfuryl alcohol, furfural, and the like. Thus the group R' may also include a cyclic or a heterocyclic radical. This group comprises mainly those ethylenic compounds of carbon, hydrogen and oxygen in which the ethylenic grouping is bound to oxygen by carbon atoms which have no more than two valence bonds satisfied by oxygen, derivatives of such compounds, and the sulfur analogs of some of them. The copolymer formed by this process may be varied further by incorporating in the reaction mixture a dienic hydrocarbon such as, for example, butadiene-1,3, isoprene, or cyclopentadiene, and the like, or acetylenic hydrocarbons.

Polymerization catalysts utilizable in the production of drying oils from a sludge containing the same include acid-acting metal halides such as aluminum bromide and aluminum chloride, and boron trifluoride, which, for the purpose of these specifications, is also considered an acid-acting metal halide catalyst. While these catalysts are generally used by themselves, it is within the scope of this invention to use acid-acting gases as promoters for these catalysts when necessary. These acid-acting gases include hydrogen fluoride and hydrogen chloride, and in some cases hydrogen bromide in the vapor phase may be utilized. These catalysts form conjunct polymerization products which are structurally and physically similar to the conjunct polymers formed when hydrogen fluoride is utilized as described in our copending application, Serial No. 30,158, filed May 29, 1948 now Patent No. 2,622,109. These catalysts differ chiefly from hydrogen fluoride in the manner of recovering the conjunct polymers from sludges containing said catalysts.

The operating temperature used in this process has a profound influence upon the nature of the reaction or reactions occurring when a substituted ethylene compound or its derivative is reacted with an olefinic hydrocarbon having at least three carbon atoms per molecule in the presence of an acid-acting metal halide catalyst for example, aluminum chloride. Part of this effect of temperature may be due to the behavior of the olefinic hydrocarbons themselves in the presence of an acid-acting metal halide catalyst. The monoolefins having at least three carbon atoms per molecule undergo extensive polymerization and condensation with substituted ethylene compounds as herein set forth in the presence of an acid-acting metal halide catalyst at temperatures of from about 0° C. to about 175° C., and preferably at temperatures of from about 10° to about 125° C.

The condensation and polymerization of these olefinic hydrocarbons and substituted ethylene compounds involves more than the simple combination of olefinic molecules to form dimers, trimers, tetramers and higher polymers. It has been observed and these observations have been made the basis of the present process that when a mixture of an olefinic hydrocarbon having at least three carbon atoms per molecule and a substituted ethylene compound of the class herein described is subjected to conjunct copolymerization in the presence of a conjunct polymerization catalyst, a conjunct copolymer product is formed in significantly greater yield than in the case of the conjunct polymerization of the monoolefin only. The modified chemical structure of the product (by virtue of the presence of oxygen compounds) markedly affects the drying properties of the material, that is, the modified polymer forms an air-dried film of excellent adherence which dries to a non-tacky, non-brittle film producing the desired properties of such films for drying oil purposes. Further, the presence of an unsaturated alcohol, unsaturated thiol, unsaturated aldehyde, unsaturated ketone, unsaturated ester, or unsaturated ether, in the charging stock, tends to increase the yield of conjunct polymers obtained from a given weight of charging stock mixture and conjunct polymerization catalyst. The latter effect is believed to be due to the increased number of hydrogen acceptors charged to the process.

The complex series of reactions herein referred to in the aggregate as a "conjunct polymerization reaction" comprises an initial polymerization and condensation reaction between the olefinic components of the charging stock and as the reaction progresses further, cyclization and isomerization of the polymers and condensation products occur, accompanied by a hydrogen transfer reaction between the organic compounds or "conjunct polymers" present in the reaction mixture whereby a portion of the conjunct polymers is converted into highly unsaturated organic compounds containing on an average of from about 2.5 to about 4 double bonds per molecule, of which from about 40 to about 70% are conjugated.

The resulting unsaturated conjunct polymers, comprising a series of high molecular weight polyolefinic cyclic compounds, become attached by weak chemical bonds to the catalyst to form a sludge-like complex addition product in which the chlorine (in the case of an aluminum chloride catalyst) is not, however, organically bound, since it can be substantially all removed by treatment of the complex with water or with cold aqueous alkali. The saturated hydrocarbon conjunct polymers form an insoluble phase which upon settling of the reaction mixture, separates as a distinct upper layer hereinabove referred to. Since the formation of the unsaturated conjunct polymer is dependent upon the presence of hydrogen acceptors in the reaction mixture, it also follows that the proportion of hydrogen acceptors to hydrogen donors influences the total unsaturation of polyolefinic conjunct polymers formed, as well as their yield from given weights of olefinic hydrocarbon and substituted ethylene compounds charged to the process. The knowledge of the relationship between unsaturation of the hydrocarbon charging stock and the unsaturation of the ultimate drying oil product is embodied in the utilaztion of an admixture of substituted ethylene and monoolefin hydrocarbons as charging stock in the present process, to obtain conjunct copolymerization therebetween and to form a greater yield of conjunct polymers having somewhat different chemical structure than a product prepared similarly by conjunct polymerization of a monoolefin hydrocarbon only. The oxygen-modified or sulfur-modified structures of the conjunct polymers obtained in accordance with the process herein provided are believed to be the basic factors involved in the formation of the more-adherent, more-elastic, and tougher film of drying oil when exposed to atmospheric oxygen.

Study of the ultraviolet and infrared absorption spectra and other properties of drying oil fractions formed from polymer gasoline and boiling from about 150° to about 200° C., shows that many of these drying oil hydrocarbons are not aromatic but contain a pair of conjugated double bonds with one of these double bonds in a ring of five carbon atoms and the other double bond in an alkenyl side chain. Thus a cyclopentene ring may be combined with a methylene group or a vinyl group. However, some of the drying oil hydrocarbons may also contain a cyclopentadiene ring. The drying oil hydrocarbons which contain a cyclopentenyl ring also contain more than two substituent groups but each of these groups is highly substituted. The higher boiling fractions of this drying oil boiling up to about 450° C. are likewise largely nonaromatic and contain polycyclic hydrocarbons which are generally bicyclic. In both the monocyclic and polycyclic hydrocarbons the five-carbon atom ring portions of the molecules are combined with at least two alkyl groups or two unsaturated aliphatic groups. The data obtained on these fractions indicate that one of the double bonds comprised by the conjugated diene systems of the drying oil is within a five-carbon atom ring and the other double bond is in an alkenyl or alkapolyenyl substituent. Alkapolyenyl groups that may be present are highly branched and contain isolated unsaturation as well as conjugated unsaturation. Some of the typical hydrocarbons contained in the drying oil mixtures so produced from polymer gasoline are represented structurally by the following formula:

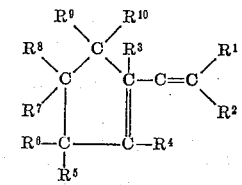

wherein the radicals $R^1$ to $R^{10}$ are selected from the group consisting of hydrogen and alkyl, alkenyl and alkapolyenyl hydrocarbon radicals, at least two of the substituents $R^4$ to $R^{10}$ are hydrocarbon radicals, and not more than two of the groups $R^1$ to $R^4$ represent hydrogen.

Other constituents of the drying oil formed from polymer gasoline are believed to have structures that may be represented by the formula:

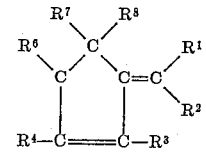

wherein $R^1$ to $R^8$ represent members of the group consisting of hydrogen and alkyl, alkenyl, and alkapolyenyl hydrocarbon radicals, at least two of the substituents $R^3$ to $R^8$ are hydrocarbon radicals, and not more than two of the substituents $R^1$ to $R^4$ are hydrogen.

The drying oils of the present process contain organic compounds having some of the aforementioned five-carbon atom ring structures condensed with a member of the group consisting of an olefinic alcohol, an olefinic thiol, an olefinic aldehyde, an olefinic ketone, an olefinic ester, and an olefinic ether.

The condensation products which are formed from the olefinic hydrocarbons and substituted ethylene compounds are of higher molecular weight than the olefinic hydrocarbon charging stock and also have good drying oil properties. Such drying oils may be regarded as containing mixtures of condensation products and of higher boiling polymers having a high degree of conjugated and nonconjugated unsaturation. These drying oils have the advantage that many of them form protective films which are less brittle and more durable than those films formed from higher boiling unsaturated oils produced similarly from olefinic hydrocarbons alone without the addition of the substituted ethylene compounds aforementioned.

This process of condensation or copolymerization for producing drying oils may be modified further by incorporating in the reaction mixture a certain amount of a more unsaturated olefinic hydrocarbon, namely, a dienic hydrocarbon as, for example, butadiene-1,3, isoprene, cyclopentadiene and the like, or an acetylenic hydrocarbon.

The present process consists essentially of contacting an olefinic hydrocarbon and a substituted ethylene compound with an acid-acting metal halide catalyst at conjunct polymerization conditions, separating the upper saturated hydrocarbon layer from the lower catalyst sludge layer, and then decomposing the sludge by water hydrolysis or by heating or other suitable means to recover the drying oil therefrom.

Improvement in adherent properties of the drying oil product is observed when about two mol per cent of the substituted ethylene compound is present but when more than about equal molecular proportions of the substituted ethylene compound is reacted with an olefinic hydrocarbon, the amount of condensation and speed of the condensation process are retarded. Accordingly, the molar ratio of olefins having at least 3 carbon atoms per molecule to substituted ethylene compound will depend upon the properties desired in the product but may vary from about 1 to about 50. The weight ratio of acid-acting metal halide catalyst to organic charging stock, that is the combined mixture of olefinic hydrocarbon and substituted ethylene compound will vary from about 0.1 to about 10. When the acid-acting metal halide catalyst to organic compound weight ratio is less than about 0.1, it is necessary to recycle excessive amounts of organic compounds in order to obtain good conversion, while increase in this ratio above about 10 effects very little further increase in yield of the desired reaction products, but such increased ratio of acid-acting metal halide catalyst to organic reactants does decrease the capacity of the reactor and other treating equipment.

The present process is carried out at a temperature of from about 0 to about 175° C. and at a pressure sufficient to maintain the reactants and catalysts in substantially liquid phase. The operating pressure is generally from about 1 to about 100 atmospheres. At these reaction conditions, a vigorously agitated mixture of aluminum chloride, substituted ethylenic compounds, and olefinic hydrocarbons containing at least 3 carbon atoms per molecule yields a high proportion of catalyst layer containing polyunsaturated organic compounds during a time of from about 1 to about 30 minutes, but the reaction may be conducted for a longer time to obtain a still better yield of the polyunsaturated organic compounds and a more highly saturated hydrocarbon mixture, which is separated as an upper layer from the aluminum chloride catalyst layer.

Olefinic hydrocarbons having more than 3 carbon atoms per molecule are more desirable as charging stocks than propylene because of the increased yields of both saturated and unsaturated liquid products and improved properties of the products obtained from these preferred charging stocks. About the same quantity and quality of drying oil are obtained when charging any of the olefins having from 4 to about 12 carbon atoms per molecule. The different monoolefins having at least four carbon atoms per molecule appear to be mutually interconvertible by polymerization and depolymerization reactions at the conditions specified for this purpose.

It is of particular interest to note that in this type of copolymerization, in which hydrogen transfer occurs, the product recovered from the sludge or catalyst layer has a higher molecular weight than the charge stock, and is more unsaturated than the charge stock, and is more unsaturated than the charge stock on a molar basis.

It should be noted further that the introduction of polar groups into the polyenic conjunct polymer permits further modification of this product. For example, if an alcohol group is introduced into the molecule by conjunct copolymerization, the product may be esterified subsequently with either monobasic or polybasic acids (which may, in turn, be saturated or unsaturated) to make a large variety of esters and polyesters having a wide range of properties, or if acidic groups are introduced into the molecule by conjunct polymerization, the product may be esterified subsequently with either monohydric or polyhydric alcohols, or be reacted with amines, of either saturated or unsaturated type, to make a large variety of esters and amides having a wide range of properties.

In carrying out this process, an olefinic hydrocarbon having at least 3 carbon atoms per molecule, a substituted ethylene compound, and an acid-acting metal halide catalyst, such as aluminum chloride, are added to a suitable reactor provided with adequate means for activating the reactor contents and for controlling the temperature therein. Since the condensation, polymerization, and copolymerization reactions of this process are exothermic, it is generally necessary to cool the reactor in order to maintain a chosen reaction temperature. The olefinic hydrocarbon, substituted ethylene compound, and acid-acting metal halide catalyst such as aluminum chloride, are generally mixed at such rates that substantially all of the organic compounds charged are converted into the saturated hydrocarbon layer and the polyunsaturated organic materials contained in the catalyst layer. After the desired quantities of organic materials comprising essentially olefinic hydrocarbons and substituted ethylene compounds have been added to the acid-acting metal halide catalyst such as aluminum chloride, or after the acid-acting metal halide catalyst has been added to the organic materials, the agitation or stirring of the reaction mixture is generally continued for a time sufficient to ensure essentially complete conversion of the reactants into saturated hydrocarbons and into polyunsaturated organic liquid having drying oil properties. The agitation or mixing is then stopped and the reaction mixture is permitted to stand whereby it forms two layers: an upper substantially saturated hydrocarbon layer, and a lower acid-acting metal halide catalyst layer. The substantially saturated hydrocarbon layer is separated from the lower acid-acting metal halide catalyst layer and highly unsaturated organic material of drying oil properties.

As the saturated hydrocarbons of the upper layer boil over about the same range of temperature as do the unsaturated drying oil constituents recoverable from the acid-acting metal halide catalyst lower layer and as small amounts of the saturated hydrocarbons are entrained or mixed with the acid-acting metal halide catalyst lower layer, it is advisable to extract the acid-acting metal halide catalyst lower layer with a lower boiling saturated hydrocarbon, preferably a paraffin having from 3 to about 8 carbon atoms per molecule, before hydrolyzing or neutralizing or otherwise decomposing the acid-acting metal halide catalyst lower layer to recover the unsaturated drying oil therefrom. From the lower layer, the acid-acting metal halide catalyst and drying oil fractions are then separated by suitable means, for example, the lower layer may be added to water or ice, whereby the acid-acting metal halide catalyst reacts with the water to form an aqueous solution or suspension from which the drying oil separates as an upper layer. In some instances it may be desirable to use a caustic solution for decomposition of the drying oil and acid-acting metal halide catalyst complex. Also when the acid-acting metal halide catalyst is boron trifluoride, the lower layer may be subjected to flash distillation, to vaporize the boron trifluoride from the higher boiling highly unsaturated dry oil. When the lower layer is separated by distillation methods, the recovered boron trifluoride is suitable for recycling to the process to effect reaction of additional quantities of the charged monoolefinic hydrocarbons and oxygenated compounds.

The passage of inert gas such as nitrogen, hydrogen, methane, ethane, carbon dioxide, and the like, through the distillation system in which the boron trifluoride is being separated, assists in the recovery of the highly unsaturated drying oil.

One method of carrying out the process of this invention is illustrated diagrammatically by the figure which is a flow diagram indicating the various steps of the process. According to the method illustrated, an olefin-containing feed stock such as a butane-butylene or pentane-pentene mixture, is directed through line 1 to mixing zone 2 to which a substituted ethylene compound is directed through line 3, and anhydrous aluminum chloride is introduced through line 4. Mixing zone 2 comprises a coil, an agitated reaction zone, or other mixing equipment, preferably provided with suitable temperature control means, such as, for example, a cooling or heating jacket or cooling or heating coil in order to maintain the reaction mixture at a chosen temperature within the limits of from about 0° to about 175° C. The reaction mixture present in mixing zone 2 may also contain a lower boiling saturated hydrocarbon which is separated from the final reaction products and recycled through line 14 to line 1 hereinafter described. The olefin-containing feed stocks, substituted ethylene compound, and aluminum chloride, are contacted in mixing zone 2 for a time sufficient to convert substantially all of the olefin monomers and substituted ethylene compounds into condensation products and polymers and also to effect hydrogen transfer reactions between the various polymers and condensation products so as to produce a substantially saturated hydrocarbon product and a highly unsaturated product, the latter being associated with the aluminum chloride catalyst.

From mixing zone 2, the resultant mixture is directed through line 5 to settling zone 6 wherein the mixture or emulsion of organic compounds and aluminum chloride is permitted to stand and to separate into an upper hydrocarbon layer and a lower aluminum chloride catalyst layer. From settling zone 6, the aluminum chloride catalyst layer is withdrawn through line 7 to catalyst layer separating zone 8, while the substantially saturated hydrocarbon material which separates as an upper layer in zone 6 is directed through line 9 to hydrocarbon layer separating zone 10.

The aluminum chloride catalyst layer in separating zone 8 is decomposed, as hereinbefore set forth, with water or caustic to separate therefrom a highly unsaturated organic material comprising drying oil materials. The decomposed aluminum chloride so separated in zone 8 is directed therefrom through line 11 to disposal or recovery of desired aluminum salts or oxides. The highly unsaturated liquid drying oil material is discharged from separating zone 8 through line 12 to storage or other purification or fractionation not illustrated in the figure.

The hydrocarbon layer so separated from used aluminum chloride catalyst in settling zone 6 is subjected to suitable fractionation in hydrocarbon separating zone 10, preferably after water-washing (by means not shown) to remove residual amounts of catalyst. Fractional distillation of the hydrocarbonaceous material present in zone 10 separates therefrom as an overhead fraction, substantially saturated low boiling hydrocarbons, introduced to the process in the olefin-containing charge stock, or made during the conversion process. Thus when charging a butane-butylene fraction, the hydrocarbon stream being directed from separating zone 10 through line 13, is mainly n-butane while this stream is mainly n-pentane when a pentane-pentene mixture is charged to mixing zone 2. If desired, a portion of the low boiling saturated hydrocarbon fraction which is discharged through line 13 may be directed therefrom through recycle line 14 to line 1, already mentioned, through which the olefin-containing feed stock is directed to the process. After removal of the low boiling saturated hydrocarbons in the hydrocarbon separating zone 10, a substantially saturated hydrocarbon product formed by the condensation, polymerization, and hydrogen transfer reactions is directed from zone 10 through line 15 to further purification where any residual amounts of aluminum chloride catalyst may be washed therefrom (if this has not been done before the stream entered zone 10, as described above) and then to storage or to use not illustrated in the diagrammatic drawing.

When the olefinic charging stock does not contain a substantial proportion of saturated hydrocarbons having from 3 to about 8 carbon atoms per molecule, it is advisable to extract the aluminum chloride catalyst layer with such a solvent before separating a drying oil from the aluminum chloride layer in separating zone 8.

The following examples are given to illustrate the process of this invention, although the data introduced should not be construed to limit unduly the broad scope of the invention.

EXAMPLE I

Several runs are made in which a polymer gasoline is reacted with a substituted ethylene compound in the presence of an aluminum chloride catalyst. These runs are carried out in a turbomixer autoclave of 1 liter capacity and the resultant aluminum chloride sludge is decomposed by water hydrolysis. The polymer gasoline employed in these runs has a bromine number of 132, a calculated molecular weight of 105, a specific gravity ($d_4^{20}$) of 0.712 and the following Engler distillation characteristics:

| I. B. P. °F. | 10% | 30% | 50% | 70% | 90% | E. P. | Percent Over |
|---|---|---|---|---|---|---|---|
| 83 | 140 | 206 | 231 | 276 | 383 | 436 | 94.5 |

This polymer gasoline is reacted with allyl alcohol, diallyl phthalate, and vinyl acetate as indicated in Table I which also gives some of the properties of the upper layer and lower layer products.

Table I.—Reaction of polymer gasoline with allyl alcohol, vinyl acetate, and diallyl phthalate respectively in the presence of aluminum chloride

| Run No | 1 | 2 | 3 |
|---|---|---|---|
| Reaction Temp., °C | 90–95 | 90–95 | 90–95 |
| Reaction Time, Hours | 4 | 4 | 4 |
| Charge, gms.: | | | |
| Allyl Alcohol | 12 | 0 | 0 |
| Diallyl Phthalate | 0 | 0 | .54 |
| Vinyl Acetate | 0 | 21 | 0 |
| Polymer Gasoline | 185 | 185 | 185 |
| Aluminum Chloride, Anhydrous | 50.7 | 56.6 | 84.8 |
| Recovered, gms.: | | | |
| Upper Layer | 94.6 | 88.4 | 98.8 |
| Lower Layer | 145.2 | 158.2 | 212.0 |
| Lower Layer Products, after hydrolysis, gms | 88.5 | 90.5 | 108 |
| Lower Layer Products after hydrolysis, percent of organic charge | 45 | 44 | 45 |
| Properties of Products: | | | |
| Upper Layer— | | | |
| Bromine No | 4 | 3 | 1 |
| Specific Dispersion | 104 | 104 | |
| Lower Layer Product— | | | |
| Bromine No | 180 | 177 | 142 |
| Maleic Anhydride Value | 67 | 73 | 68 |
| Molecular Weight | 258 | 260 | 296 |
| Carbon, percent | 86.5 | 86.6 | 86.3 |
| Specific Dispersion | 138 | 137 | 140 |
| Hydrogen, percent | 12.3 | 12.6 | 12.1 |
| Oxygen (by diff.), percent | 1.2 | 0.8 | 1.6 |
| Viscosity (poises) | <5 | <5 | <5 |
| Percent Boiling Above 345° C | 37 | 28 | 64 |
| Percent Copolymerization (from carbon and hydrogen analysis) | 32 | 9 | 12 |

In the run made with polymer gasoline and allyl alcohol, the unsaturated product gives negative tests with acetyl chloride showing the absence of hydroxyl groups. Carbon and hydrogen analyses show the presence of 1.2% oxygen (approximately 32% of that charged) in the hydrolyzed lower layer product. It is considered probable that high molecular weight ethers are formed. The oil recovered from the aluminum chloride layer dries on exposure to air in a thin film to a hard, adherent coating.

In the run made with polymer gasoline and vinyl acetate, conjunct polymerization occurs with the separation of an upper hydrocarbon layer and a lower aluminum chloride layer. The unsaturated organic material obtained by hydrolyzing the aluminum chloride layer indicates, by carbon and hydrogen analyses, that only 0.8% oxygen is present, corresponding to about 9% of that charged in the vinyl acetate. Although the yield of lower layer product based on the total charging stock is 44%, and accordingly somewhat higher than the yield of 35–40% generally obtained from polymer gasoline alone, the higher yield probably results from the action of vinyl acetate as a hydrogen acceptor thereby allowing more polymerization of the olefin monomers. Vinyl acetate does not appear in the upper layer as the upper layer material is saturated and contains no oxygen based on carbon and hydrogen analyses. It appears that much of the vinyl acetate (or material derived from it) remains in the lower layer coordinated with aluminum chloride and is then washed out during the hydrolysis and washing procedure. A film of the drying oil obtained from the lower layer product dries hard and shows good adherence to metals.

When poly gasoline and diallyl phthalate are reacted in the presence of aluminum chloride, conjunct polymerization is obtained with the formation of a saturated upper layer and a lower aluminum chloride layer. Hydrolysis of the lower aluminum chloride layer causes a separation of a solid at the interface of the oil and water layers. This solid is separately recovered and washed with normal pentane in which it is insoluble. The acidity determination (590) shows it to be roughly equivalent to that for phathalic acid (675) while carbon and hydrogen analyses give results very close to those for phthalic acid. The percentage of oxygen by difference represents 81% of the oxygen charged in the charging stock, while the calculations of the 30 grams of solid as phthalic acid show that it represents 82% of the diallyl phthalate. It appears that the aluminum chloride causes a splitting of the ester to set free the phthalic acid. Acetyl chloride tests on both the upper layer and lower layer liquids show the absence of alcohol groups. Carbon and hydrogen analyses on the upper layer and the lower layer liquids show the presence of oxygen in each of these products. About 7% of the charged oxygen is found in the upper layer and about 12% is found in the lower layer organic material which together with the 81% found in the solid, account for all of that charged.

The lower layer liquid product is somewhat similar in bromine number and maleic anhydride values to that produced from polymer gasoline alone, but is somewhat higher in molecular weight, indicating some conjunct polymerization and copolymerization takes place. The lower layer liquid product was subjected to a drying test with the result that a test film dries readily to a hard, adherent film which eventually becomes slightly brittle.

EXAMPLE II

A sample of terpineol was redistilled to give a fraction boiling at 136° C. at a pressure of 60 mm. of mercury and having a refractive index $n_D^{20}$ of 1.4820, a specific dispersion of 104, and a specific gravity $(d_4^{20})$ of 0.9367.

In a run employing this material, 35 grams of alpha-terpineol, 185 grams of polymer gasoline, and 53.4 grams of aluminum chloride are reacted in a turbomixer autoclave of 1 liter capacity at a temperature of 90–95° C., for five hours at a maximum pressure of 70 pounds per square inch. The resultant reaction product is then separated into about 160 grams of a lower aluminum chloride layer and about 103 grams of an upper layer. The upper layer and pentane extract of the lower aluminum chloride layer after washing with water yields about 105 grams of hydrocarbons. The lower aluminum chloride layer after hydrolysis with water and water washing yields about 95 grams of an unsaturated organic liquid which represents about 43% by weight of the total polymer gasoline and terpineol charged. Conjunct polymerization is obtained as evidenced by the formation of a saturated upper layer and an unsaturated lower layer product. Carbon and hydrogen analyses of the lower layer products show an oxygen content of 0.5% which represents about 13% of that charged. This lower percentage of oxygen indicates substantially complete dehydration of terpineol during treatment with aluminum chloride. However, as in the case of similar treatment of a mixture of limonene (dipentene) and polymer gasoline with aluminum chloride, the chief evidence of co-polymerization is in the greater yield of product which also may result from the functioning of alpha-terpineol as a hydrogen acceptor. On the basis of the drying oil yield obtainable from polymer gasoline alone, the present yield may represent some 80% copolymerization. Drying tests on the organic product recovered from the organic layer both with and without driers, show that the product dried readily to a hard finish but that the finish eventually became slightly brittle.

EXAMPLE III

In this run, 24 grams of furfural, 185 grams of polymer gasoline, and 94 grams of aluminum chloride are contacted for 3 hours in a turbomixer autoclave of 1 liter capacity at a temperature of 90–95° C. At the end of this treatment the contents of the turbo-mixer are transferred to a flask and the upper and lower layers are then separated by decantation and pentane extraction. The upper layer product, after the pentane is distilled therefrom, is recovered as a saturated hydrocarbon mixture which indicates that conjunct polymerization has occurred.

The lower layer after hydrolysis with water yields a liquid and a solid. The solid is only slightly soluble in pentane and is separated from the liquid by filtering and washing with pentane. The solid which is isolated contains oxygen in an amount equal to about 40% by weight of that charged in the original furfural, while the amount found in the liquid product represents 20% by weight of that charged. This latter value is believed to represent the amount of copolymerization in the liquid product, although the actual amount may be greater in view of the numerous ways in which furfural may be dehydrated.

Drying oil tests on the organic material obtained by hydrolyzing the aluminum chloride layer show that a test film of the liquid product dries readily to a hard finish.

EXAMPLE IV

Furfuryl alcohol and polymer gasoline are reacted in the presence of aluminum chloride following the procedure employed in Example III. Conjunct polymerization occurs, but it is necessary to separate the upper saturated hydrocarbon layer by pentane extraction from the aluminum chloride lower layer. Hydrolysis of the aluminum chloride lower layer yields a solid and a liquid, the former consisting primarily of polymers formed from dehydrating furfuryl alcohol and the liquid consisting essentially of a drying oil material formed from the polymer gasoline commingled with at least 5% of a copolymer formed from polymer gasoline and furfuryl alcohol. A test film of the liquid drying oil product formed in this run dries readily to a hard, adherent finish.

EXAMPLE V

A mixture comprising 25 grams of vinyl-n-butyl ether and 185 grams of polymer gasoline are contacted with 57 grams of aluminum chloride in a turbomixer autoclave at 90–95° C. for two hours. The product, after settling, comprises about 98 grams of an upper layer (which, after washing, has a bromine number of 1) and about 160 grams of catalyst phase. From the latter is recovered after pentane extraction and hydrolysis, about 95 grams of an organic drying oil containing about 0.9% oxygen (approximately 22% of that charged after vinyl ether) and having the following other porperties:

| | |
|---|---|
| Bromine No | 163 |
| Maleic anhydride value | 80 |
| Molecular weight | 225 |
| Refractive index ($n_D^{20}$) | 1.4784 |
| Color (Gardner) | 14 |

This oil, when exposed in a thin film with added metal driers, dries to a hard film in one day. The dried film is flexible and nonbrittle after six weeks of exposure.

Valuable material useful in the preparation of drying oils, resins, and other chemical products may be formed by the conjunct polymerization or copolymerization of substituted ethylene compounds of the type hereinabove described in the absence of olefinic hydrocarbons and in the presence of an acid-acting metal halide catalyst.

We claim as our invention:

1. A process for producing a drying oil which comprises mixing from about 0.1 to about 10 parts per weight of a catalyst consisting essentially of an acid-acting metal halide and 1 part by weight of a mixture of from about 1 to about 50 molar proportions of a monoolefinic hydrocarbon having at least 3 carbon atoms per molecule and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product and an acid-acting metal halide catalyst layer containing a polyunsaturated drying oil, separating the reaction mixture into a hydrocarbon layer and an acid-acting metal halide catalyst layer, recovering a drying oil from the acid-acting metal halide catalyst layer, and recovering a substantially saturated hydrocarbon product from the hydrocarbon layer.

2. A process for producing a drying oil which comprises mixing from about 0.1 to about 10 parts per weight of a catalyst consisting essentially of an acid-acting metal halide and 1 part by weight of a mixture of from about 1 to about 50 molar proportions of propylene and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an acid-acting metal halide catalyst layer containing a polyunsaturated drying oil, separating the reaction mixture into a hydrocarbon layer and an acid-acting metal halide catalyst layer, recovering a drying oil from the acid-acting metal halide catalyst layer, and recovering a substantially saturated hydrocarbon product from the hydrocarbon layer.

3. A process for producing a drying oil which comprises mixing from about 0.1 to about 10 parts per weight of a catalyst consisting essentially of an acid-acting metal halide and 1 part by weight of a mixture of from about 1 to about 50 molar proportions of butylene and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an acid-acting metal halide catalyst layer containing a polyunsaturated drying oil, separating the reaction mixture into a hydrocarbon layer and an acid-acting metal halide catalyst layer, and recovering a substantially saturated hydrocarbon product from the hydrocarbon layer.

4. A process for producing a drying oil which comprises mixing from about 0.1 to about 10 parts per weight of a catalyst consisting essentially of an acid-acting metal halide and 1 part by weight of a mixture of from about 1 to about 50 molar proportions of a normally liquid monoolefin having at least 3 carbon atoms per molecule and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an acid-acting metal halide catalyst layer containing a polyunsaturated drying oil, separating the reaction mixture into a hydrocarbon layer and an acid-acting metal halide catalyst layer, recovering a drying oil from the acid-acting metal halide catalyst layer, and recovering a substantially saturated hydrocarbon product from the hydrocarbon layer.

5. A process for producing a drying oil which comprises mixing from about 0.1 to about 10 parts per weight of a catalyst consisting essentially of an acid-acting metal halide and 1 part by weight of a mixture of from about 1 to about 50 molar proportions of a polymer gasoline and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an acid-acting metal halide catalyst layer containing a polyunsaturated drying oil, separating the reaction mixture into a hydrocarbon layer and an acid-acting metal halide catalyst layer, recovering a drying oil from the acid-acting metal halide catalyst layer, and recovering a substantially saturated hydrocarbon product from the hydrocarbon layer.

6. A process for producing a drying oil which comprises mixing from about 0.1 to about 10 parts per weight of a catalyst consisting essentially of aluminum chloride and 1 part by weight of a mixture of from about 1 to about 50 molar proportions of a monoolefinic hydrocarbon having at least 3 carbon atoms per molecule and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an aluminum chloride layer containing a polyunsaturated drying oil, separating the reaction mixture into a hydrocarbon layer and an aluminum chloride catalyst layer, recovering a drying oil from the aluminum chloride catalyst layer, and recovering a substantially saturated hydrocarbon product from the hydrocarbon layer.

7. A process for producing a drying oil which comprises mixing from about 0.1 to about 10 parts per weight of a catalyst consisting essentially of aluminum chloride and 1 part by weight of a mixture of from about 1 to about 50 molar proportions of propylene and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an aluminum chloride layer containing a polyunsaturated drying oil, separating the reaction mixture into a hydrocarbon layer and an aluminum chloride catalyst layer, recovering a drying oil from the aluminum chloride catalyst layer, and recovering a substantially saturated hydrocarbon product from the hydrocarbon layer.

8. A process for producing a drying oil which comprises mixing from about 0.1 to about 10 parts per weight of a catalyst consisting essentially of aluminum chloride and 1 part by weight of a mixture of from about 1 to about 50 molar proportions of butylene and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrogen product, and an aluminum chloride catalyst layer containing a polyunsaturated drying oil, separating the reaction mixture into a hydrocarbon layer and an aluminum chloride catalyst layer, and recovering a substantially saturated hydrocarbon product from the hydrocarbon layer.

9. A process for producing a drying oil which comprises mixing from about 0.1 to about 10 parts per weight of a catalyst consisting essentially of aluminum chloride and 1 part by weight of a mixture of from about 1 to about 50 molar proportions of a normally liquid monoolefin having at least 3 carbon atoms per molecule and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an aluminum chloride catalyst layer containing a polyunsaturated drying oil, separating the reaction mixture into a hydrocarbon layer and an aluminum chloride catalyst layer, recovering a drying oil from the aluminum chloride catalyst layer, and recovering a substantially saturated hydrocarbon product from the hydrocarbon layer.

10. A process for producing a drying oil which comprises mixing from about 0.1 to about 10 parts per weight of a catalyst consisting essentially of aluminum chloride and 1 part by weight of a mixture of from about 1 to about 50 molar proportions of a polymer gasoline and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an aluminum chloride catalyst layer containing a polyunsaturated drying oil, separating the reaction mixture into a hydrocarbon layer and an aluminum chloride catalyst layer, recovering a drying oil from the aluminum chloride catalyst layer, and recovering a substantially saturated hydrocarbon product from the hydrocarbon layer.

11. A process for producing a drying oil which comprises mixing from about 0.1 to about 10 parts per weight of a catalyst consisting essentially of aluminum bromide and 1 part by weight of a mixture of from about 1 to about 50 molar proportions of a monoolefinic hydrocarbon having at least 3 carbon atoms per molecule and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an aluminum bromide layer containing a polyunsaturated drying oil, separating the reaction mixture into a hydrocarbon layer and an aluminum bromide catalyst layer, recovering a drying oil from the aluminum bromide catalyst layer, and recovering a substantially saturated hydrocarbon product from the hydrocarbon layer.

12. A process for producing a drying oil which comprises mixing from about 0.1 to about 10 parts per weight of a catalyst consisting essentially of aluminum bromide and 1 part by weight of a mixture of from about 1 to about 50 molar proportions of propylene and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an aluminum bromide layer containing a polyunsaturated drying oil, separating the reaction mixture into a hydrocarbon layer and an aluminum bromide catalyst layer, recovering a drying oil from the aluminum bromide catalyst layer, and recovering a substantially saturated hydrocarbon product from the hydrocarbon layer.

13. A process for producing a drying oil which comprises mixing from about 0.1 to about 10 parts per weight of a catalyst consisting essentially of aluminum bromide and 1 part by weight of a mixture of from about 1 to about 50 molar proportions of butylene and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an aluminum bromide catalyst layer, containing a polyunsaturated drying oil, separating the reaction mixture into a hydrocarbon layer and an aluminum bromide catalyst layer, and recovering a substantially saturated hydrocarbon product from the hydrocarbon layer.

14. A process for producing a drying oil which comprises mixing from about 0.1 to about 10 parts per weight of a catalyst consisting essentially of aluminum bromide and 1 part by weight of a mixture of from about 1 to about 50 molar proportions of a normally liquid monoolefin having at least 3 carbon atoms per molecule and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an aluminum bromide catalyst layer containing a polyunsaturated drying oil, separating the reaction mixture into a hydrocarbon layer and an aluminum bromide catalyst layer, recovering a drying oil from the aluminum bromide catalyst layer, and recovering a substantially saturated hydrocarbon product from the hydrocarbon layer.

15. A process for producing a drying oil which comprises mixing from about 0.1 to about 10 parts per weight of a catalyst consisting essentially of aluminum bromide and 1 part by weight of a mixture of from about 1 to about 50 molar proportions of a polymer gasoline and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and an aluminum bromide layer containing a polyunsaturated drying oil, separating the reaction mixture into a hydrocarbon layer and an aluminum bromide catalyst layer, recovering a drying oil from the aluminum bromide catalyst layer, and recovering a substantially saturated hydrocarbon product from the hydrocarbon layer.

16. A process for producing a drying oil which comprises mixing from about 0.1 to about 10 parts per weight of a catalyst consisting essentially of boron trifluoride and 1 part by weight of a mixture of from about 1 to about 50 molar proportions of a monoolefinic hydrocarbon having at least 3 carbon atoms per molecule and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and a boron trifluoride layer containing a polyunsaturated drying oil, separating the reaction mixture into a hydrocarbon layer and a boron trifluoride catalyst layer, recovering a drying oil from the boron trifluoride catalyst layer, and recovering a substantially saturated hydrocarbon product from the hydrocarbon layer.

17. A process for producing a drying oil which comprises mixing from about 0.1 to about 10 parts per weight of a catalyst consisting essentially of boron trifluoride and 1 part by weight of a mixture of from about 1 to about 50 molar proportions of propylene and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and a boron trifluoride catalyst layer containing a polyunsaturated drying oil, separating the reaction mixture into a hydrocarbon layer and a boron trifluoride catalyst layer, recovering a drying oil from the boron trifluoride catalyst layer, and recovering a substantially saturated hydrocarbon product from the hydrocarbon layer.

18. A process for producing a drying oil which comprises mixing from about 0.1 to about 10 parts per weight of a catalyst consisting essentially of boron trifluoride and 1 part by weight of a mixture of from about 1 to about 50 molar proportions of butylene and 1 molar proportion of an olefinic organic compound selected from the members of the group consisting of an olefinic alcohol, an olefinic thiol, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and a boron trifluoride catalyst layer containing a polyunsaturated drying oil, separating the reaction mixture into a hydrocarbon layer and a boron trifluoride catalyst layer, and recovering a substantially saturated hydrocarbon product from the hydrocarbon layer.

19. A process for producing a drying oil which comprises mixing from about 0.1 to about 10 parts per weight of a catalyst consisting essentially of boron trifluoride and 1 part by weight of a mixture of from about 1 to about 50 molar proportions of a normally liquid monoolefin having at least 3 carbon atoms per molecule and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and a boron trifluoride catalyst layer containing a polyunsaturated drying oil, separating the reaction mixture into a hydrocarbon layer and a boron trifluoride catalyst layer, recovering a drying oil from the boron trifluoride catalyst layer, and recovering a substantially saturated hydrocarbon product from the hydrocarbon layer.

20. A process for producing a drying oil which comprises mixing from about 0.1 to about 10 parts per weight of a catalyst consisting essentially of boron trifluoride and 1 part by weight of a mixture of from about 1 to about 50 molar proportions of a polymer gasoline and 1 molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0 to about 175° C., and at a pressure of from about 1 to about 100 atmospheres, agitating the reaction mixture for a time sufficient to form polymerization and condensation products and to effect hydrogen exchange to form a reaction mixture containing a substantially saturated hydrocarbon product, and a boron trifluoride catalyst layer containing a polyunsaturated drying oil, separating the reaction mixture into a hydrocarbon layer and boron trifluoride catalyst layer, recovering a drying oil from the boron trifluoride catalyst layer, and recovering a substantially saturated hydrocarbon product from the hydrocarbon layer.

References Cited in the file of this patent

UNITED STATES PATENTS

| | | |
|---|---|---|
| 2,253,323 | Christmann | Aug. 19, 1941 |
| 2,622,109 | Bloch et al. | Dec. 16, 1952 |